Dec. 9, 1947.   C. S. GLASGOW ET AL   2,432,408
RETRACTABLE LANDING GEAR
Filed Dec. 7, 1942    5 Sheets-Sheet 1

Edward F. Burton
Charles S. Glasgow
INVENTOR.
BY J. Edwin Coates
ATTORNEY

Fig. 4

Edward F. Burton
Charles S. Glasgow
INVENTOR.

BY J Edwin Coates
ATTORNEY

Dec. 9, 1947.  C. S. GLASGOW ET AL  2,432,408
RETRACTABLE LANDING GEAR
Filed Dec. 7, 1942  5 Sheets-Sheet 5

Edward F. Burton
Charles S. Glasgow
INVENTOR.

BY J. Edwin Coates
ATTORNEY

Patented Dec. 9, 1947

2,432,408

UNITED STATES PATENT OFFICE 2,432,408

RETRACTABLE LANDING GEAR

Charles S. Glasgow, West Los Angeles, and Edward F. Burton, Los Angeles, Calif., assignors to Douglas Aircraft Company, Inc., Santa Monica, Calif.

Application December 7, 1942, Serial No. 468,304

17 Claims. (Cl. 244—102)

This invention relates to a retractable landing gear for aircraft. It is especially applicable to a main landing gear for relatively heavy airplanes.

It is one object of the invention to provide a landing gear which may be extended from the compartment in the nacelle or other part of the airplane into landing position under emergency conditions by the dynamic action of the relatively moving air stream. A landing gear is normally retracted into its housing compartment and extended therefrom by power means, usually a hydraulic jack. Should this power means fail, a landing gear of this invention is readily and rapidly extended by the action of gravity and of wind load.

It is another object of the invention to provide a sturdily constructed locking mechanism for securely fixing the relatively moving parts of the landing gear in extended landing position. It is a further object to provide such a locking mechanism which will automatically lock the gear when it assumes the fully extended position and additionally a locking mechanism which is locked and released by the same power means which effects the extension and retraction of the gear.

It is an object of the invention to provide an efficient bungee device which will apply a resilient force to the relatively moving parts of the landing gear tending to move them to extended landing position. Assurance of extension of the landing gear is thereby increased, the bungee aiding the power means under normal conditions and augmenting the action of gravity and wind resistance when the power means partially or wholly fails. It is a further object of the invention to provide an arrangement of a bungee device which will act upon both the folding links and the link locking mechanism, urging the links to extended position and the locking mechanism into locking position to the end that, whenever other forces and conditions permit, the landing gear will be moved to landing position and locked in that position.

It is still another object of the invention to provide an arrangement of the hydraulic jack and linkage connecting the aircraft structure and main wheel carrying strut which will afford a load-stroke curve of a character favorable to the proper operation of the landing gear during movement of extension and retraction, and particularly a load-stroke curve in which the load will not be excessive at any one stage of the stroke but of a generally uniform and moderate value.

In the absence of a locking latch, when the gear is fully retracted, the hydraulic jack is the only means acting to hold the gear in its retracted position. If the load-stroke curve for retraction and extension terminates at the retraction end with a relatively low load value, it is apparent that the linkage, of which such a curve gives the performance character, operates to enable the hydraulic jack to hold the gear in fully retracted position at a relatively high mechanical advantage. It is therefore a further object of this invention to provide an arrangement of the hydraulic jack and linkage connecting the aircraft structure and main wheel carrying strut which will afford a load-stroke curve in which the load will be relatively light at the retraction end of the curve.

Under some conditions confronting a designer, a dual wheel gear is indicated as preferable to a single wheel construction. Two small wheels may be less expensive, more practicable and more easily procurable than one large wheel for a given load requirement, especially the greater loads to which the landing gear of a large airplane is subjected. It is an object of the invention to provide a retracting linkage which will, in the retracted position, occupy the space between the two wheels of a dual wheel gear, thus combining the advantages of the dual wheel construction with the advantage of a compact arrangement of the retracted landing gear, reducing the size of the nacelle compartment and lessening the weight of the gear.

It is still another object of the invention to provide a door-closing device for the landing gear compartment in the nacelle which is controlled by the moving parts of the gear with efficiency, reliability, security and without slap either during operative movements or while in closed position.

Other objects and advantages will appear from a reading of the following description and claims taken together with the accompanying drawings.

In the drawings which are for illustrative purposes.

Figures 1, 2, 3:
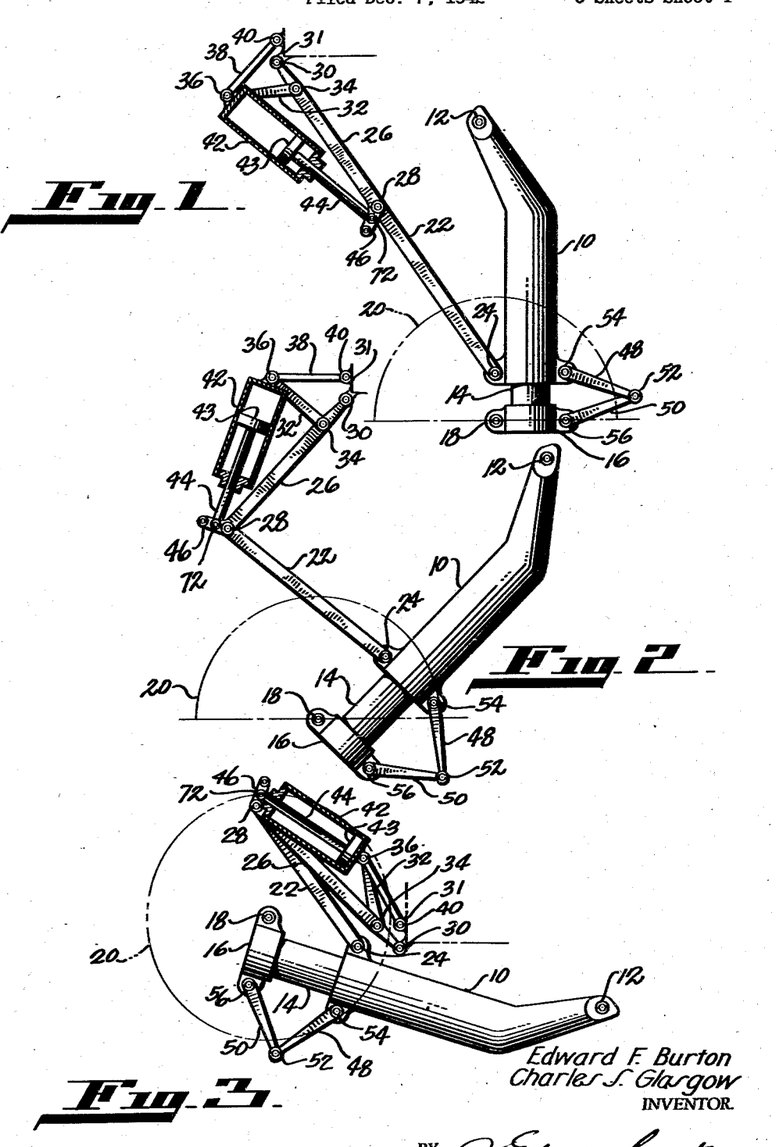
Figure 1 is a schematic view showing the landing gear in its fully extended position.
Figure 2 is a schematic view similar to Figure 1 showing the landing gear partially retracted.
Figure 3 is a schematic view similar to Figure 2 showing the landing gear fully retracted.

In detail and with reference to the accompanying drawings, Figures 1, 2 and 3 schematically show a shock strut 10, the shock absorbing operation of which is well known in the art, and which is pivoted to a shaft 12 mounted on the airplane frame structure 31. A piston plunger 14 of the shock absorber of the strut carries a collar 16 to which is secured an axle 18 upon which dual pneumatic wheels 20 are mounted. The retracting linkage comprises a pair of upper break links 26 and a pair of lower break links 22 the latter being cross braced to form a single rigid member. The links are hinged together by a shaft 28. The lower link is pivoted at its lower end 24 to the shock strut. The upper ends of the break links 26 are pivoted to a shaft 30 mounted on the airplane structure 31.

A pair of outer retracting link arms 32 are pivoted by means of a shaft 34 to the upper break links on an axis which is adjacent the pivot shaft 30. The opposite ends of the arms 32 are pivoted to a pivot shaft 36 to which is also pivoted a hydraulic strut or jack 42 and additional retracting link arms 38 which are in turn pivoted to the airplane structure 31 by a pivot shaft 40. A piston plunger 44 of the hydraulic strut 42 is pivoted to a shaft 72 carried between extension arms 46 on the upper break links 26 in a manner presently to be described.

In order to keep the axle carrying collar 16 and the piston 14 from turning with respect to the shock strut 10, the usual upper and lower torque links 48 and 50 are provided which are pivoted together at 52, the upper torque links being pivoted to the shock strut at 54 and the lower links to the axle carrying collar 16 at 56.

As shown in Figures 4, 5, 9, 10 and 11, a locking mechanism is supported between extension arms 46 of the upper drag links 26. When the landing gear is in its fully extended position, the break links 22 and 26 are in a longitudinally aligned relationship. The upper ends of the lower break links have arms 63 extending laterally outwardly therefrom in overlapping relation with the arms 46 of the upper links 26 when the links 22 and 26 are in extended position.

Arcuate recesses 62 formed at the outer ends of the arms 63 receive the shaft 60 carried between the arms 46 and act as a stop therefor when the links 22 and 26 are in extended position, preventing the drag links from moving outwardly past their position of longitudinal alignment. "Outwardly" as used herein in connection with the break links refers to that side of the links which trails in the folding movement of gear retraction.

Figure 9:
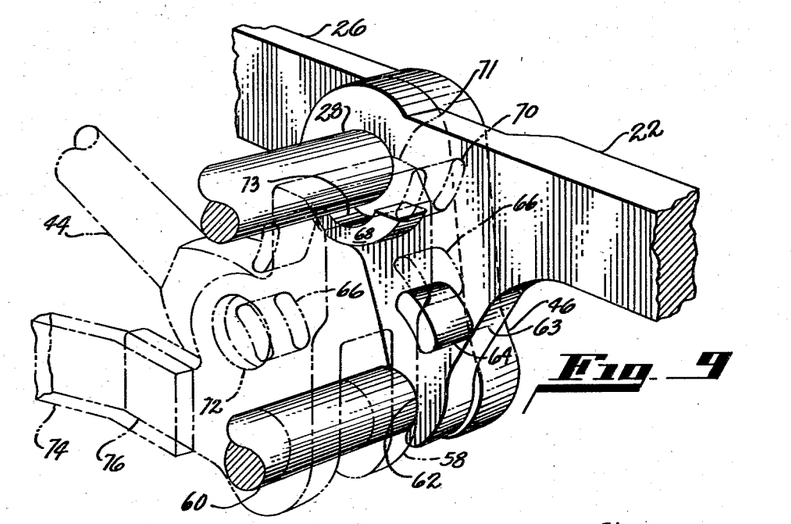
Figure 9 is a perspective view of the landing gear locking device shown in the locked position.
Figure 10:
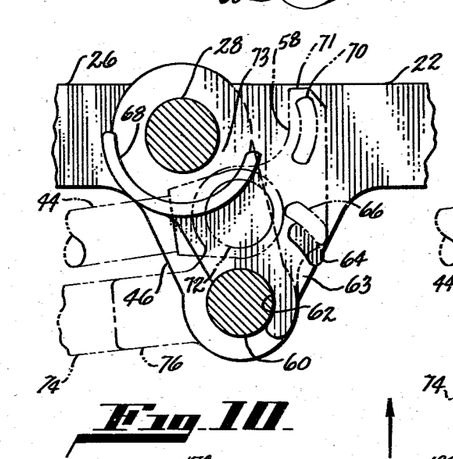
Figure 10 is a sectional view of the locking mechanism in the locked position showing the drag links in solid lines and the locking latch in phantom lines.
Figure 11:
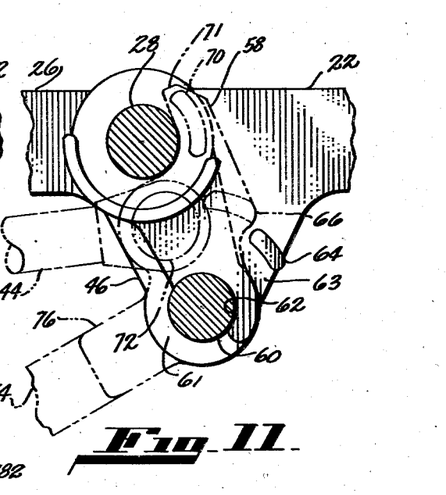
Figure 11 is a sectional view similar to Figure 10 showing the locking mechanism in the unlocked position.

A latch arm 58 pivoted to the shaft 60 is provided with a finger 71 at its outer end arcuately contoured on its inner face to engage the pivot shaft 28. The inner face of the finger 71 serves as a stop to limit movement of the latch arm 58 when the plunger 44 is retracted. A lug 64 is formed on the inner face of each of the lower drag link arms 63, which is adapted to engage one of two similar lugs 66 provided on the latch arm 58 when the latch arm is rotated to the right. A semi-circular guide flange 68 concentric with the shaft 28 is provided on the inner face of each of the lower drag links. This flange is spaced from the shaft and forms therewith a groove 73 adapted to receive and guide a lug 70 carried by the latch arm 58.

As the piston of the plunger 44 is pivoted with the pin 72 carried by the latch arm 58, continued movement of the plunger to the right, as viewed in Figures 9, 10 and 11, after the shaft 60 has been moved into engagement with the stop 62, pivotally moves the latch arm to the right to cause the lug 70 to move out of the retaining groove 73. When the lug 70 is free of the groove 73 the arm is moved downwardly to cause lugs 64 and 66 to engage and lock the arms 22 and 26 against relative angular movement. It will also be noted that the engagement between the lugs 74 and 76 also limits the angular movement of the latch arm in a clockwise direction. When the plunger 44 is moved in the opposite direction the arm 58 is pivotally moved upwardly to disengage lugs 64 and 66. This counter-clockwise movement of the arm aligns the lugs 70 with the semi-circular guide grooves 73 and brings the stop 71 into engagement with the shaft 28. Continued retracting movement of the plunger simultaneously causes the lugs 70 to enter the grooves 73 and the upper and lower drag links to be moved from their longitudinally aligned positions to one in which they are disposed substantially parallel to one another.

Figure 4:
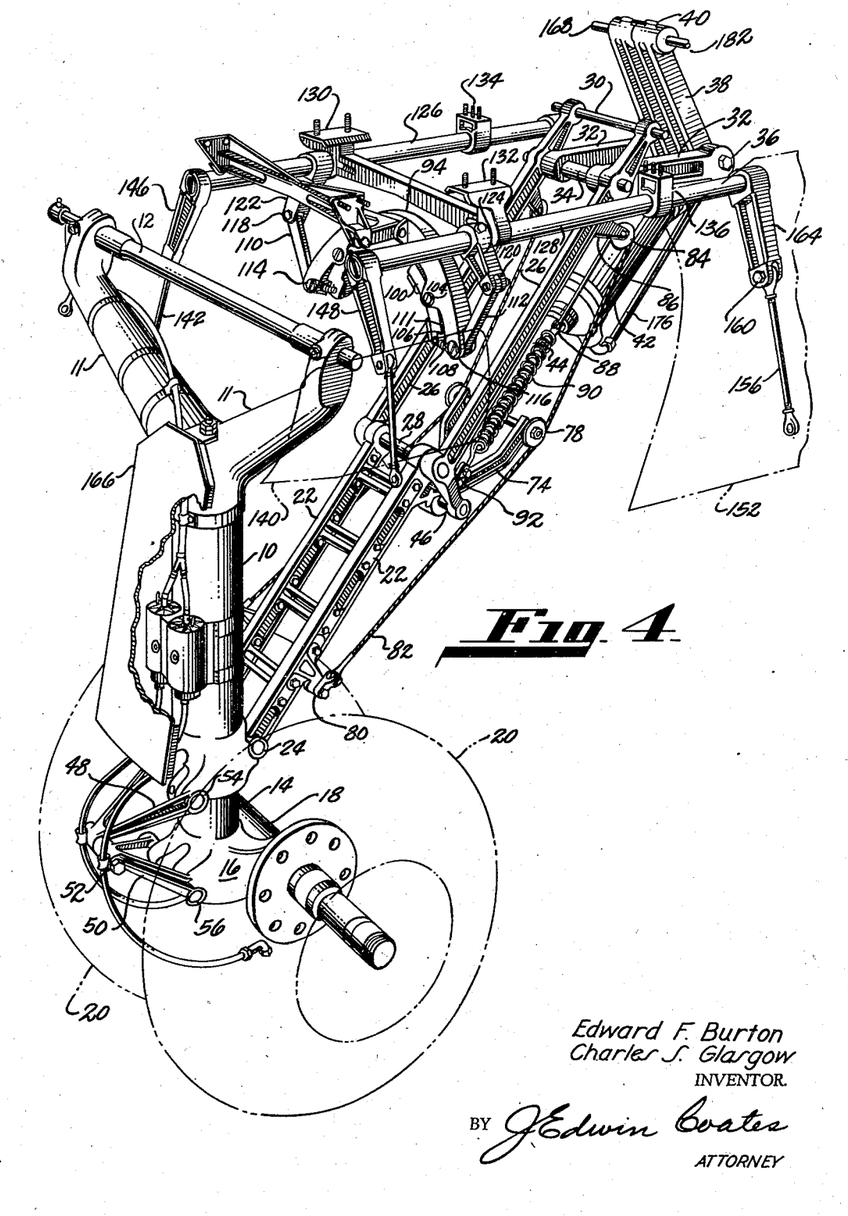
Figure 4 is a perspective view of the landing gear in its fully extended position.
Figure 5:
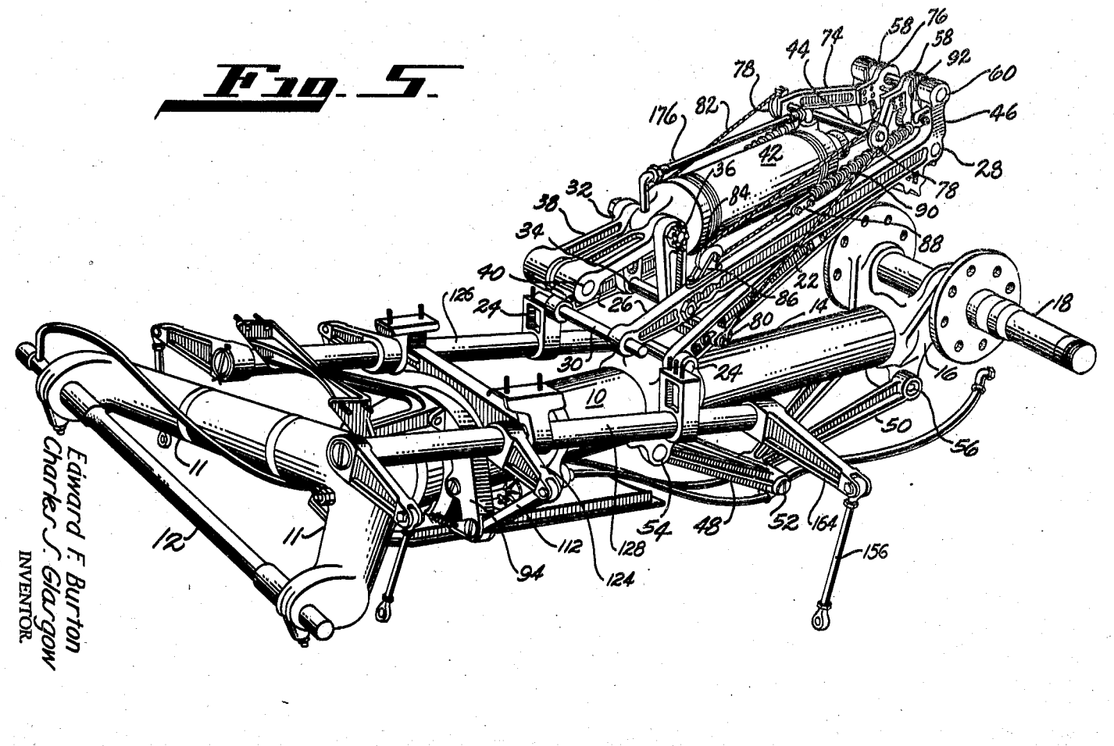
Figure 5 is a perspective view of the landing gear similar to that in Figure 4 showing the gear in a fully retracted position.
Figure 6:
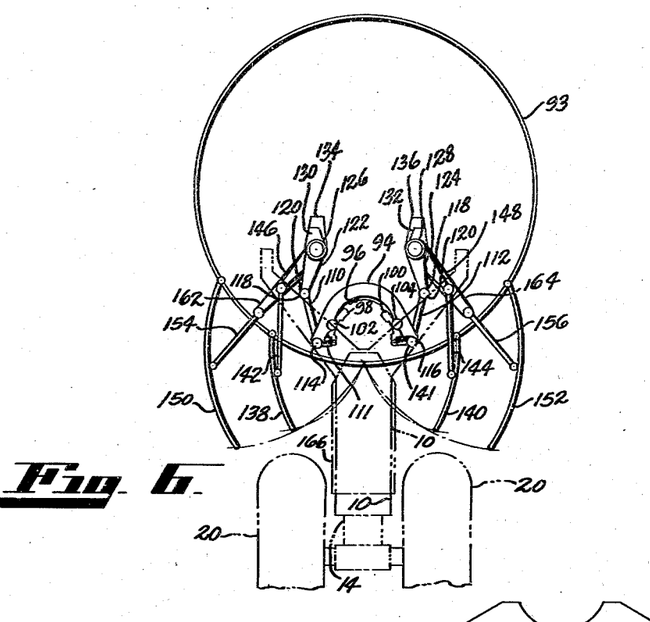
Figure 6 is a sectional elevation taken through the landing gear and nacelle showing the door operating mechanism in the open position while the landing gear is extended.
Figure 7:
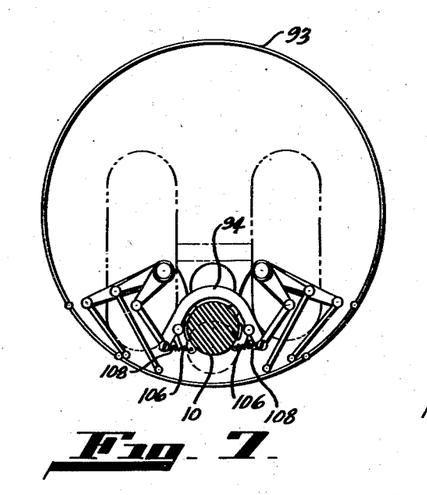
Figure 7 is a sectional elevation taken through the landing gear and nacelle similar to that shown in Figure 6 showing the door operating mechanism and landing gear in the retracted position.

Yoke arms 74 are secured to the extensions 76 of the lower portions of the latch member 58. Two pulleys 78 are provided on the outer extremities of the yoke arms 74 which are set in longitudinal alignment with a pair of cables 82 each anchored at one end to a bracket 80 on a lower drag link, and at the other end passing over a pulley 84 mounted in a pulley bracket 86 which is attached to the corresponding upper drag link 26, and terminating in a cable end fitting 88. A double tension spring 90 is interposed between each fitting 88 and a terminal link 92 which is secured to the corresponding extension arm 46 on an upper break link 26. As shown in Figures 4 and 5 the pulleys 78 on the ends of the yoke arms 74 ride on the cable 82 which is in tension and since the yoke arms are attached to the lower portion of the safety latch member 58 the latch member is constantly and resiliently urged toward a locking position. Also the links 22 and 26 are constantly urged toward their fully extended position of longitudinal alignment by the cable 82 except when the pulleys 78 are positioned above the axial line of the lower break links during the latter portion of the retractive movement or the earlier portion of the extension movement. While pulleys 78 are so positioned, there is a small incidental resultant force of the bungee acting to urge the links toward their fully retracted position. Also, while the pulleys 78 are so positioned, there is no further elongation of the springs 90, making it possible to use smaller, lighter weight springs than otherwise would be the case.

Figure 8:
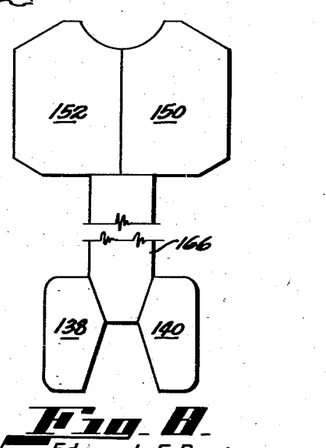
Figure 8 is a plan view of the nacelle doors in the closed position showing their general arrangement.

As shown in Figures 4, 5, 6 and 7, the shock strut 10 strikes a door operating yoke 94 in its upward swing during retraction. The door operating yoke is provided with a rest pad 96 and two padded locking arms 98 and 100 centrally pivoted to the inner faces of the yoke arms on longitudinally disposed axes at 102 and 104 respectively. The locking arms 98 and 100 are each provided with a notch 106 which receives an angled end 108 of the corresponding links 110 and 112 which are pivoted at 114 and 116 to the extremities of the yoke arms and held in locked position in the notches 106 by springs 111. The opposite end of the links 110 and 112 are pivoted at 118 and 120 to levers 122 and 124 rigidly carried by torque tubes 126 and 128. The torque tubes run parallel to the fore and aft axis of nacelle structure 93 and are rotatably mounted on the inner frame structure of the nacelle by suitable brackets 130, 132, 134 and 136. The rear nacelle doors 138 and 140 are motivated by means of adjustable rods 142 and 144 which are pivoted at one of their ends to the doors and at their other ends to levers 146 and 148 which are rigidly secured to the torque tubes 126 and 128. The front nacelle doors 150 and 152 are motivated by similar adjustable rods 154 and 156 which are pivoted at one of their ends to the nacelle doors and at their other ends to levers 162 and 164 fixed to the torque tubes 126 and 128. The center nacelle door 166 is not connected to the door retracting mechanism but is fixed to the shock strut 10 and is moved into a closed relationship with the other nacelle doors when the landing gear is fully retracted as shown in Figure 8.

Figure 12:
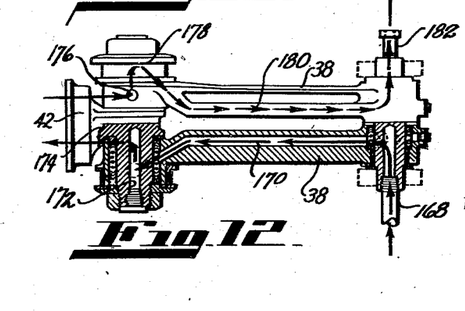
Figure 12 is a section taken through the inner retracting link showing the arrangement of fluid passages therein leading to the hydraulic jack.

The inner retracting links 38 are provided with passages as shown in Figure 12 which conduct fluid to the hydraulic cylinder 42. Fluid may flow from a fluid line leading from the selector control valve through a port 168 thence through a passage 170 in one of the links 38, into a shaft passage 172, and thence through a port 174 on the end of the cylinder 42. Simultaneously fluid from the opposite end of the cylinder 42 flows through a hose 176, into a shaft passage 178, through a passage 180 in the other link 38 and exhausts at 182 into a fluid line leading to the selector control valve. In retraction of the gear, the flow as outlined above is reversed so that fluid is directed through the port 182 and passes into the front end of the cylinder causing the piston to retract. The port 168 then becomes the exhaust opening for fluid trapped in the upper portion of the cylinder.

In operation, when the landing gear is to be retracted into the nacelle, hydraulic fluid is admitted to the inlet tube 182. From this point fluid passes through one of the inner retracting links 38 into the hose 176 and directly into the outer end portion of the cylinder 42. The piston 43 therein and the piston plunger 44 move inwardly pulling the latch member 58 upwardly against the action of the bungee cable 82 thereby dislodging the stop lugs 66 from the stop lugs 64. The guide lugs 70 are then in a position to be received by the semi-circular guide grooves 73. Continued movement of the plunger 44 pulls on the latch arm 58, the finger 71 of which bears against the shaft 28 and which therefore is now mechanically a fixed part of the arm 46 of the link 26. The force thus applied to the link 26 laterally of its longitudinal axis breaks the upper and lower links 22 and 26 about the shaft 28 which fold about themselves between the pivot shaft 30 on the inner airplane structure and the pivot shaft 24 on the shock strut 10.

The outer retracting links 32 are pivoted at the shaft 34 to the upper drag links 26 and at their other ends at the shaft 36 to the hydraulic cylinder 42 and the inner retracting links 38. The leverage of this linkage is such that the hydraulic cylinder is at all points of rotation placed in an advantageous operating position for up or down movement of the landing gear, the shaft 36 moving in a path which is at all times substantially displaced from the links 26. The median section of this path is at a greater displacement from the links 26 than the ends thereof, giving the hydraulic jack the greatest mechanical advantage when the load value is the highest due to the relatively more nearly vertical movement of the wheels and the greater air resistance corresponding to this median section of the path of shaft 36. The leverage of the linkage is also such as to place upon the hydraulic jack a light load when the gear is fully retracted enabling the jack to relatively easily hold the gear in retracted position.

As the drag links continue to fold and the landing gear is drawn into the nacelle the shock strut 10 engages the door operating yoke. The first contact of the strut in the yoke is against the two locking levers 98 and 100. This movement disengages the links 110 and 112 and as the yoke continues to move upward levers 122 and 124 turn torque tubes 126 and 128. The levers 146, 148, 162 and 164 are moved by the torque tubes to pull their respectively associated adjustable rods upward, drawing with them the doors attached thereto. Simultaneously the door 166 secured to the main strut moves into position between forward doors 150, 152 and aft doors 138 and 140 to completely close the landing gear compartment in the nacelle and present a streamlined aerodynamically clean surface to the ambient air stream. The gear is held in the nacelle by a latch (not shown) which automatically engages a catch on the aircraft frame structure. This latch is released by the pilot at the beginning of the extension movement of the gear.

When the landing gear is being extended the force of the passing air stream cooperates with the force of the hydraulic jack and with gravity to move the gear to its final landing position. Both the main strut and drag strut move with the air stream and the articulated ends of the links of the drag strut also have a folding movement in the same direction as the air stream. The bungee cable applies an additional force to effect the gear extending movement. Should the hydraulic jack fail, the gear may be extended by releasing the latch by which it is secured to the aircraft structure and allowing gravity, the wind load and the action of the bungee cable to move the gear to its extended position.

When the gear reaches fully extended position, it is automatically locked against any retracting movement by a substantial, effective and positive locking device which is constantly readied for locking action by the bungee cable and held securely in locking position by this cable after the fully extended position is reached.

It will be observed from Figures 3 and 5 that with the landing gear in retracted position the links and hydraulic jack of the retracting linkage are disposed substantially within the cylindrical space between the two wheels of the landing gear. Full advantage is thus taken of the spatial economy gained by using two wheels instead of one on the main oleo strut.

The landing gear described herein and illustrated in the accompanying drawings embodies our invention. Other landing gears may also embody the invention as to one or more or all of its features. The invention is not limited to the landing gear herein described or to any other particular landing gear but is defined in the appended claims.

We claim:

1. In an aircraft landing gear, the combination of: a pair of articulated break links longitudinally aligned in the gear extended position and foldable in the gear retracted position; a locking member fixed to one of said links; a locking member pivotally mounted on and movable with the other of said links, said last named locking member cooperative when engaged with the first named locking member to hold the links against relative angular movement; means carried by the other of said links for positively holding said pivotally mounted locking member out of engagement with said first named locking member except when the links are in the fully extended position; and resilient means acting upon the pivotally mounted locking member in all positions of the break links in a manner tending to pivotally move said locking member into engagement with said first named locking member so that said pivotally mounted member is moved into engagement with the said first named locking member upon release thereof by said holding means.

2. In an aircraft landing gear, the combination of: a pair of articulated break links longitudinally aligned in the gear extended position and foldable in the gear retracted position; a lug fixed to one of said links; a latch arm pivotally mounted on and movable with the other of said links; a lug carried by said latch arm and cooperating with the first named lug when engaged therewith to hold the links against relative angular movement; means carried by the other of said links for guiding movement of said arm and for holding said latch arm out of a position in which the lug carried thereby can engage with the first named lug except when the links are in fully extended positions; and resilient means acting upon the latch arm and normally tending to move the latch arm into a position in which the lug carried thereby is engaged with the first named lug so that said pivotally mounted member is moved into engagement with the said first named locking member upon release thereof by said holding means.

3. In an aircraft landing gear, the combination of: a main landing gear strut pivotally mounted on the frame structure of the aircraft; a drag strut on the frame structure for moving said main strut to landing and retracted positions, comprising two articulated links movable from aligned position when the gear is extended to a folded position when the gear is retracted; means for moving said links between said positions; a pulley mounted on one of said links offset from the longitudinal axes of the links when aligned and adjacent the articulating axis; an arm carried by the other of said links adjacent the end thereof; a second pulley carried by said arm; a resiliently extensible strand connected at one end to one of said links and running over the first named pulley and reversely extending about the other of said pulleys; and means for connecting the free end of said strand to the other of said links.

4. The combination defined in claim 2 in which said latch arm is pivoted to said other link on an axis radially displaced from the articulating pivot on the side opposite the folding side of said link, and in which said holding means holds said latch arm in a fixed position relative to said other link, and in addition thereto; means for applying a force to said arm in one direction when said arm is in said one radial position to move it to said fixed position and thereafter fold said links and for applying a force to said arm in the other direction when said links are in folded position to move said links to extended position and thereafter move said arm to said one radial position.

5. In an aircraft landing gear, the combination of: a main landing gear strut; means for pivotally mounting said strut on the frame structure of the aircraft; a drag strut secured to the frame structure for moving said main strut to landing and retracted positions, comprising two articulated links; a locking latch arm on one of said links for engaging and thereby locking the other link to prevent retractive articulation of said links, said latch being fixedly secured to its link in disengaged releasing position when said links are in other than landing position; and a hydraulic jack connected to transmit motion to said latch arm to move it between locking and releasing positions and additionally to move it and its link as a secured assembly between extended and retracted positions.

6. The combination defined in claim 5 and in addition thereto; a resilient means for applying a force to said latch arm tending to move it to locking position.

7. In an articulation locking device for the drag links of an airplane landing gear, the combination of: an offset first arm at the articulated end of one link extending laterally therefrom opposite the folding side of said link; a similar second arm similarly positioned on the other link; a latch pivoted to the first arm; a cylindrical stop for said latch centered on the axis of articulation; an arcuately shaped, locking, first lug on the second arm, the arc being centered about said axis when the links are in extended position; a mating arcuate second lug on the latch, concentrically beyond said first lug and equidistant therewith from said axis when said latch is in locking position, said lugs being in locking position when said latch is spaced from said cylindrical stop and being unequally spaced from said axis in release position when said latch is against said cylindrical stop; a lug on said latch proximate said cylindrical stop when said latch engages said stop; an arcuate guideway means for said lug on said other link, centered about said axis and beginning at a point proximately clearing said lug when said latch engages said cylindrical stop and said arms are in extended position, and extending around said axis on the side toward said arms; and means for moving said latch between said locking position and said release position.

8. The combination defined in claim 3 and in addition thereto; a locking device on said links for locking the links in aligned position; said strand being connected to resiliently apply a force acting to move the locking device to locking position; and means for preventing said movement to locking position except when said links are in aligned position.

9. The combination defined in claim 13, in which said mounting means comprises a link hinged at one end to the frame structure adjacently above the hinge of the upper link and hinged at the other end to the other end of the jack and comprises another link hinged at one end to the other end of the jack and hinged at the other end to the upper link to the frame structure, and in which said articulated links are inclined upwardly at a substantial angle at retraction.

10. In an aircraft having a landing-gear-enclosing chamber, the combination of: a main landing gear strut connected to the airplane to be retracted within said enclosure in a position extending longitudinally of the plane; a vertically movable transverse yoke in the chamber disposed to be moved upwardly by said strut as it moves into said chamber; closing doors for said chamber; motion transmitting means connecting the yoke and doors for closing the doors upon upward movement of said yoke; and means on said yoke for locking said motion transmitting means in door opening position when said yoke and strut are disengaged and for gripping said strut against vertical play with respect to said yoke and simultaneously unlocking said motion-transmitting means in response to vertical pressure between said strut and yoke.

11. The combination defined in claim 10 in which the said door locking and yoke gripping means comprises a pair of bell crank levers hinged to the legs respectively of said yoke approximately at the level of the yoke axis, comprises lugs on the end of said levers, the two upper lugs being contacted and spread apart by the upwardly moving strut to move the lower lugs into gripping contact with the under side of the strut and further comprises latching means on the levers and detent means on the motion-transmitting means, the latching means engaging the detent means when the levers are in positions corresponding to disengagement of the yoke and strut and the latching means disengaging the detent means in response to pressural engagement of the yoke and strut.

12. In an aircraft landing gear, the combination of: a pair of articulated break links longitudinally aligned in the gear extended position and foldable in the gear retracted position; a lug fixed to one of said links; a latch arm pivotally mounted on and movable with the other of said links; a guiding lug carried by said arm; a latching lug carried by said latch arm and cooperating with the first named lug when engaged therewith to hold the links against relative angular movement; means carried by the other of said links and engaging said guiding lug and holding said latch arm against pivotal movement relative to the link to which it is pivotally mounted until said links are moved to the fully extended position; and resilient means acting upon the latch and normally tending to move the latch arm into a position in which the lug carried thereby is engaged with the first named lug.

13. In an aircraft landing gear, the combination of: a main landing gear strut; means for pivotally mounting said strut on the frame structure of an aircraft; a drag strut for moving said main strut to landing and retracted positions, comprising two articulated links, the upper link being hinged to said frame structure and the lower link being connected to said main strut; a hydraulic jack pivotally secured at one end to the lower end portion of the upper link on an axis adjacent the articulation axis; mounting means attached to the frame structure including means for pivotally supporting the other end of the jack outwardly of the upper end portion of the upper link; and means to constrain said jack supporting means to move in a path wherein said supporting means is substantially outwardly offset from said upper link during the movement of said articulated links whereby the mechanical advantage of the jack is substantially constant throughout the entire range of movement of said upper link.

14. In an aircraft landing gear, the combination of: a landing gear strut; means for pivotally mounting the upper end of said strut on the frame structure of an aircraft; a hydraulic jack; means for pivotally securing one end of said jack to the lower end portion of said strut for movement about an axis adjacent the lower end of said strut; a pair of articulated support links; means for pivotally securing the free ends of said links to said frame structure and the end of said strut adjacent the pivotally mounting means respectively; means for pivotally supporting the other end of said jack for movement about the articulation axis of said support links whereby the last named end of said jack moves in an arcuate path outwardly offset from said strut during movement of said landing gear, thereby maintaining the mechanical advantage of the jack substantially constant throughout the entire range of movement of said landing gear during extension and retraction thereof.

15. In an aircraft landing gear, the combination of: a landing gear strut; means for pivotally mounting the upper end of said strut on the frame structure of an aircraft; a hydraulic jack; means for pivotally securing one end of said jack to the lower end portion of said strut for movement about an axis adjacent the lower end of said strut; a pair of supporting links; pivot means for connecting an end of one of said supporting links to an end of the other of said links, the free end of said jack being secured to said pivot means; means for pivotally securing the free end of one of said supporting links to said frame structure; and means for pivotally securing the free end of the other of said supporting links to said strut so that said pivot means and the end of the jack secured thereto is displaced from said strut thereby effecting a substantially constant lever arm on which the force developed by said jack is exerted throughout substantially the entire cycle of retraction and extension of said landing gear.

16. In an aircraft landing gear, the combination of: a landing gear strut; means for pivotally mounting the upper end of said strut on the frame structure of an aircraft; a hydraulic jack; means for pivotally securing one end of said jack to the lower end portion of said strut for movement about an axis adjacent the lower end of said strut; a pair of supporting links; pivot means for connecting an end of one of said supporting links to an end of the other of said links, the free end of said jack being secured to said pivot means; means for pivotally securing the free end of one of said supporting links to said frame structure; and means for pivotally securing the free end of the other of said supporting links to said strut so that said pivot means and the end of the jack secured thereto is displaced a substantial distance from said strut and movable in an arcuate path relative to said frame structure during movement of said landing gear whereby the mechanical advantage of said jack is substantially constant throughout substantially the entire cycle of retraction and extension of said landing gear.

17. In an aircraft landing gear, the combination of: a landing gear strut; means for pivotally mounting the upper end of said strut on the frame structure of an aircraft; a hydraulic jack pivotally secured at one end to the lower end portion of said strut on an axis adjacent the lower end thereof; a pair of supporting links; pivot means for connecting an end of one of said supporting links to an end of the other of said links; means for pivotally securing the free end of one of said supporting links to said frame structure at a point spaced from the pivotal connection between said frame structure and said strut; and means for pivotally securing the free end of the other of said supporting links to said strut so that said pivot means interconnecting said supporting links is moved during movement of said strut in an arcuate path relative to the frame structure, the free end of said jack being secured to said pivot means so that the end of the jack is displaced from the strut thereby effecting a lever arm on which the force developed by said jack is exerted during substantially the entire cycle of retraction and extension of said landing gear.

CHARLES S. GLASGOW.
EDWARD F. BURTON.

REFERENCES CITED

The following references are of record in the file of this patent:

UNITED STATES PATENTS

| Number | Name | Date |
|---|---|---|
| 2,049,066 | Kindelberger | July 28, 1936 |
| 2,280,185 | Bridges | Apr. 21, 1942 |
| 2,294,467 | Lemonier | Sept. 1, 1942 |

FOREIGN PATENTS

| Number | Country | Date |
|---|---|---|
| 524,929 | Great Britain | Aug. 19, 1940 |
| 518,073 | Great Britain | Feb. 16, 1940 |
| 494,557 | Great Britain | Oct. 27, 1938 |
| 526,353 | Great Britain | Sept. 17, 1940 |